United States Patent
Garaev et al.

(10) Patent No.: US 12,067,422 B2
(45) Date of Patent: Aug. 20, 2024

(54) DYNAMICALLY ACQUIRING SCOPED PERMISSIONS TO PERFORM OPERATIONS IN COMPUTE CAPACITY AND RESOURCES

(71) Applicant: Microsoft Technology Licensing, LLC, Redmond, WA (US)

(72) Inventors: Dmitry Dmitrievich Garaev, Redmond, WA (US); Carlos Gustavo Oseguera Guerrero, Maple Valley, WA (US); Andrey Anatolyevich Lukyanov, Redmond, WA (US); Haruya Shida, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 647 days.

(21) Appl. No.: 17/203,834

(22) Filed: Mar. 17, 2021

(65) Prior Publication Data

US 2022/0300332 A1    Sep. 22, 2022

(51) Int. Cl.
G06F 9/50    (2006.01)

(52) U.S. Cl.
CPC .................. G06F 9/5027 (2013.01)

(58) Field of Classification Search
CPC ...... G06F 9/5027; G06F 21/629; G06F 21/85; G06F 9/468
See application file for complete search history.

(56) References Cited

U.S. PATENT DOCUMENTS

| | | | |
|---|---|---|---|
| 6,058,426 A * | 5/2000 | Godwin | G06F 9/468 709/224 |
| 9,819,598 B2 | 11/2017 | Lee et al. | |
| 10,097,530 B2 | 10/2018 | Yang et al. | |
| 10,785,211 B2 | 9/2020 | Zhu et al. | |
| 2014/0317449 A1* | 10/2014 | Kohno | G06F 9/5027 718/104 |
| 2016/0182487 A1 | 6/2016 | Zhu et al. | |
| 2018/0278614 A1 | 9/2018 | Miller et al. | |
| 2019/0199705 A1* | 6/2019 | Zhu | H04L 63/083 |

FOREIGN PATENT DOCUMENTS

WO     2018200153 A1     11/2018

OTHER PUBLICATIONS

"International Search Report and Written Opinion Issued in PCT Application No. PCT/US22/018412", Mailed Date: Aug. 30, 2022, 12 Pages.
"Control Plane Security", Retrieved from: http://web.archive.org/web/20201203174412/https:/cloud.google.com/kubernetes-erigine/docs/concepts/control-plane-security, Dec. 3, 2020, 4 Pages.

(Continued)

*Primary Examiner* — Cao H Nguyen
(74) *Attorney, Agent, or Firm* — RAY QUINNEY & NEBEKER P.C.; Paul N. Taylor

(57) ABSTRACT

A control plane in a computing system receives a request to perform a management task on a set of computing system resources. The control plane identifies a target scope on which the management task is to be performed and dynamically obtains permissions, for this specific request, to perform the management task on the resources in the identified target scope.

20 Claims, 5 Drawing Sheets

(56) References Cited

OTHER PUBLICATIONS

"Using RBAC Authorization", Retrieved from: http://web.archive.org/web/20210110190644/https:/kubernetes.io/docs/reference/access-authn-authz/rbac/, Jan. 10, 2021, 20 Pages.

Kang, et al., "Automated Permission Model Generation for Securing SDN Control-Plane", In Journal of IEEE Transactions on Information Forensics and Security vol. 15, Oct. 11, 2019, pp. 1668-1682.

Lyon, et al., "Azure Control Plane Security", Retrieved from: https://docs.microsoft.com/en-us/azure/architecture/framework/security/design-identity-control-plane, Jul. 9, 2019, 4 Pages.

Santos, et al., "Decentralizing SDN's Control Plane", In Proceedings of the 39th Annual IEEE Conference on Local Computer Networks, Sep. 8, 2014, pp. 402-405.

Tseng, et al., "Controller DAC: Securing SDN Controller with Dynamic Access Control", In Proceedings of the IEEE International Conference on Communications, May 21, 2017, 6 Pages.

\* cited by examiner

DYNAMICALLY ACQUIRING SCOPED PERMISSIONS TO PERFORM OPERATIONS IN COMPUTE CAPACITY AND RESOURCES

BACKGROUND

Computing systems are currently in wide use. Some computing systems host applications that can be accessed by client computing systems of a number of different tenants. The different tenants can be different organizations.

The hosted applications may be configured on hosted resource clusters which are accessed by the client devices. The hosted applications can be managed and maintained by control functionality that can be deployed in a control plane. In order to perform a management task (such as create resources, update resources, delete resources, etc.), the control plane receives a request to perform the management task. However, the control plane must have permissions to perform the management task and can obtain approval from an approver system to perform the management tasks.

The discussion above is merely provided for general background information and is not intended to be used as an aid in determining the scope of the claimed subject matter.

SUMMARY

A control plane in a computing system receives a request to perform a management task on a set of computing system resources. The control plane dynamically identifies a target scope, for this specific request, on which the management task is to be performed and obtains permissions to perform the management task on the resources within the identified target scope.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, a control plane needs permissions to perform management operations on computing system resources in a hosted environment. In some current systems, the control plane has standing permissions for the entire compute capacity of a hosted environment. However, this can be problematic. The static permissions often enable a scope of operation that is much larger than is needed to perform a requested management task. This can make it easier to carry out a surreptitious operation. For instance, when permissions are granted for a large scope of computing system resources, then operations can be performed anywhere within that scope, thus enabling surreptitious operations to be performed on any of the resources.

The present discussion thus proceeds with respect to a system in which the control plane can dynamically identify a scope that is to be used in order to perform a requested management task. For instance, the control plane can receive a signal indicative of a request to perform a management task. The control plane can then dynamically identify the target scope that is needed to perform that management task, and generate an approval request that requests approval to perform the management task in the identified target scope. This dynamic identification of scope, prior to obtaining approval, can greatly reduce the scope within which operations can be performed, thus enhancing security and reducing the likelihood that surreptitious actions can be taken within the computing system resources. By dynamically, in one example, it is meant that the target scope is identified by the control plane for each particular request to perform a management task and approval is requested for that target scope. This is different from a static scope in which the control plane is authorized to perform operations within a pre-defined scope, that is not determined on a per-request basis. Because the static scope is not determined on a request-specific basis, the static scope must cover many different types of request to perform management tasks, and many different management tasks. Therefore, the static scope is often very broad and gives access to resources that are needed to perform many tasks for which approval is sought.

Figure 1:
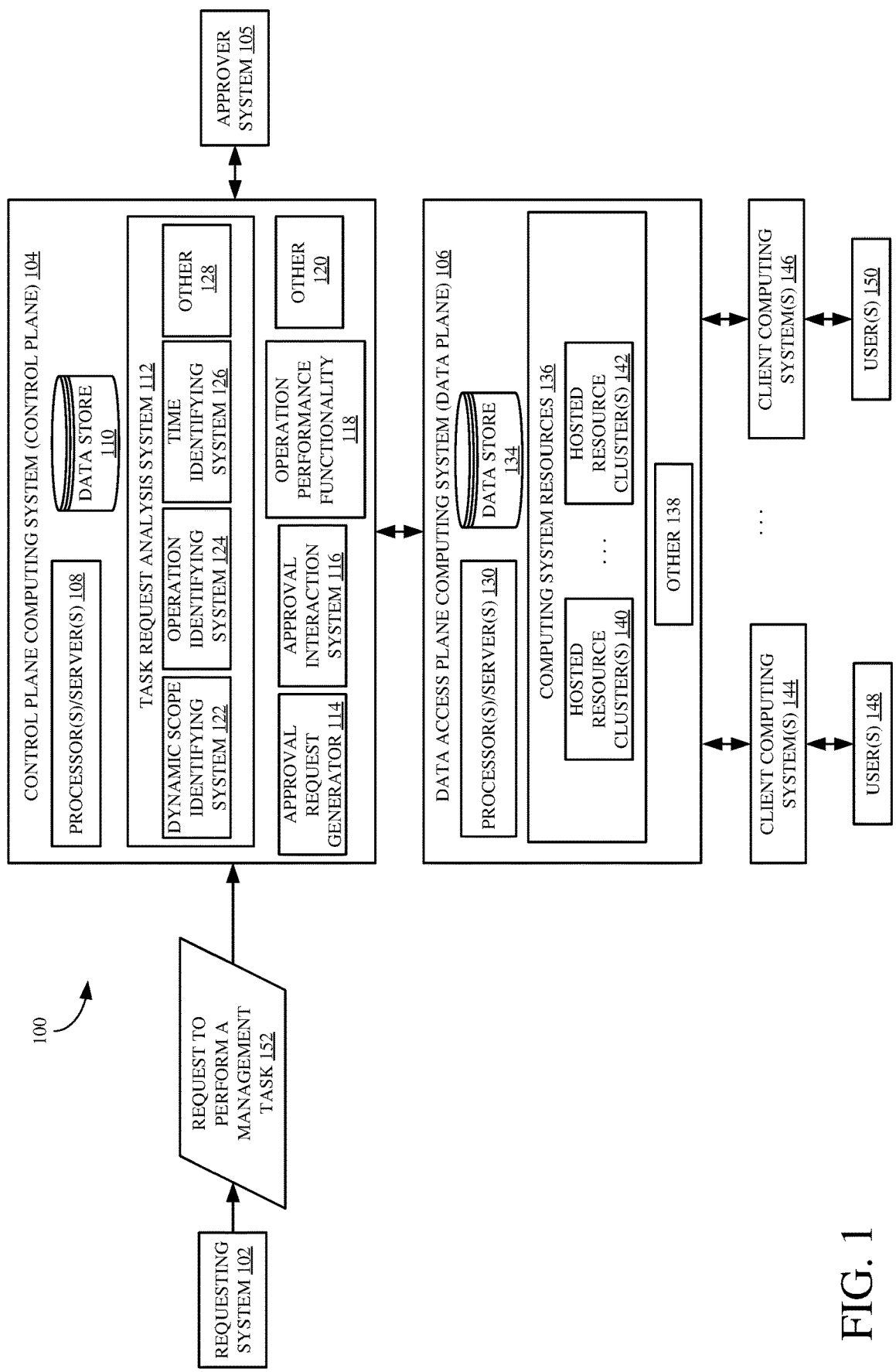
FIG. 1 is a block diagram of one example of a computing system architecture.

FIG. 1 is a block diagram of one example of a computing system architecture 100. Computing system architecture 100 includes a requesting system 102, control plane computing system (or control plane) 104, approver system 105, and data access plane computing system (or data plane) 106. Control plane computing system 104 can include one or more processors or servers 108, data store 110, task analysis system 112, approval request generator 114, approval interaction system 116, operation performance functionality 118, and other items 120. Task analysis system 112 can include dynamic scope identifying system 122, operation identifying system 124, time identifying system 126, and other items 128.

Data access plane computing system 106 can include one or more processors or servers 130, data store 134, computing system resources 136 and other items 138. Data access plane computing system 106 may include a set of computing system resources 136 that run code for different users. Computing system resources 136 can be divided into a plurality of different hosted resource clusters 140-142. The hosted resource clusters 140-142 can be arranged in rings. For instance, resource clusters 140 can be a test ring while resource clusters 142 can be a production ring. These rings are examples only. The resource clusters 140-142 can be accessed by a plurality of different client devices 144-146 which, themselves, can be accessed and manipulated by different sets of users 148-150. The client devices 144-146 may belong to different tenants (wherein a tenant may be an organization) with tenant-based users. The different tenants may have access to different resource clusters 140-142 in the computing system resources 136 so that data for different tenants remains separate. In addition, the different tenants may have different subscriptions to applications or services deployed on different computing system resources 136 and corresponding functionality. Each different tenant may have one or more different subscriptions to different services, computing system resources and/or computing system functionality.

Before describing the overall operation of architecture 100 in more detail, a brief description of some of the items in architecture 100 will first be provided.

Requesting system 102 may be an engineering system, a help system, or another system that allows engineers or other users of system 102 to generate requests to perform a management task on items in data access plane computing system 106. A request to perform a management task is illustrated by block 152 in FIG. 1. The task represented in request 152 may be executed by performing a number of different operations on one or more different resources 136 or resources clusters 140-142. The operations may be performed across tenants, across clusters 140-142, across subscriptions, or within a single tenant, subscription or resource cluster.

Control plane computing system 104 can be used to deploy, manage, and configure code that is used by client computing systems 144-146 to access client data. The data access functionality in computing system 106 is then used by users 148-150 to access the data and to access user functionality implemented by the code. Thus, control plane computing system 104 is used to perform management tasks, deployment tasks, and other configuration tasks on the data access functionality in computing system 106, and on computing system resources 136.

Before performing a management task, however, control plane computing system 104 first dynamically identifies a target scope within data access plane computing system 106 to which access is needed by control plane computing system 104 in order to perform the requested management task. For instance, assume that the management task requested by request 152 is to provide a fix to networking resources across multiple subscriptions in computing system resources 136. In that case, dynamic scope identifying system 122 analyzes the request to determine the particular resource clusters 140-142 that need to be accessed in order to perform the requested management task. The clusters that need to be accessed may be across different subscriptions, they may be a subset of the networking resources, or they may be determined at another granularity. Dynamic scope identifying system 122 identifies the particular resource clusters and/or operations or other functionality that needs to be accessed in data access plane computing system 106 as the identified target scope for the requested management task.

To identify the target scope, system 122 may consider the specific operations that will be performed in executing the management task. Operation identifying system 124 can analyze the request 152 to identify the different operations that need to be performed within the data plane 106 in order to carry out the requested management task. For instance, system 124 may identify that, in order to perform the requested management task, the system must obtain data from virtual machines, reconfigure memory, or perform other operations in performing the overall management task.

Time identifying system 126 identifies a temporal window (or time span) that is indicative of the amount of time needed to perform the management task. For instance, different operations may have different corresponding latency or may take a different amount of time to perform. Thus, once the operations in the management task have been identified by system 124, system 126 can identify a temporal window (or time span) for which permissions or approval may be sought. Approval request generator 114 then generates an approval request that can be submitted to approver system 105.

Approval request generator 114 can determine or identify the type of approval that will be needed to perform the requested management task. For instance, if the management task is to be performed in a test ring of hosted resource clusters, then approval request generator 114 may determine that an automated approval is sufficient. However, if the requested management task is to be performed on resource clusters within a production ring in which the management task will be operating in an environment that has wide access to user data, then approval request generator 114 may determine that the request 152 must be approved by a human approver. Regardless of the type of approval that is needed, approval request generator 114 generates an approval request which identifies the management task that is to be performed (and possibly the operations within that management task), and the target scope for the management task identified by dynamic scope identifying system 122. The request can identify a desired temporal window identified by time identifying system 126 as well.

The approval request is then provided to approval interaction system 116 which submits the approval request to approver system 105 and handles the interactions with approver system 105. Once the request for performing the management task has been approved, then operation performance functionality 118 executes the management task, within the authorized target scope, in data access plane computing system 106.

Figure 2A:
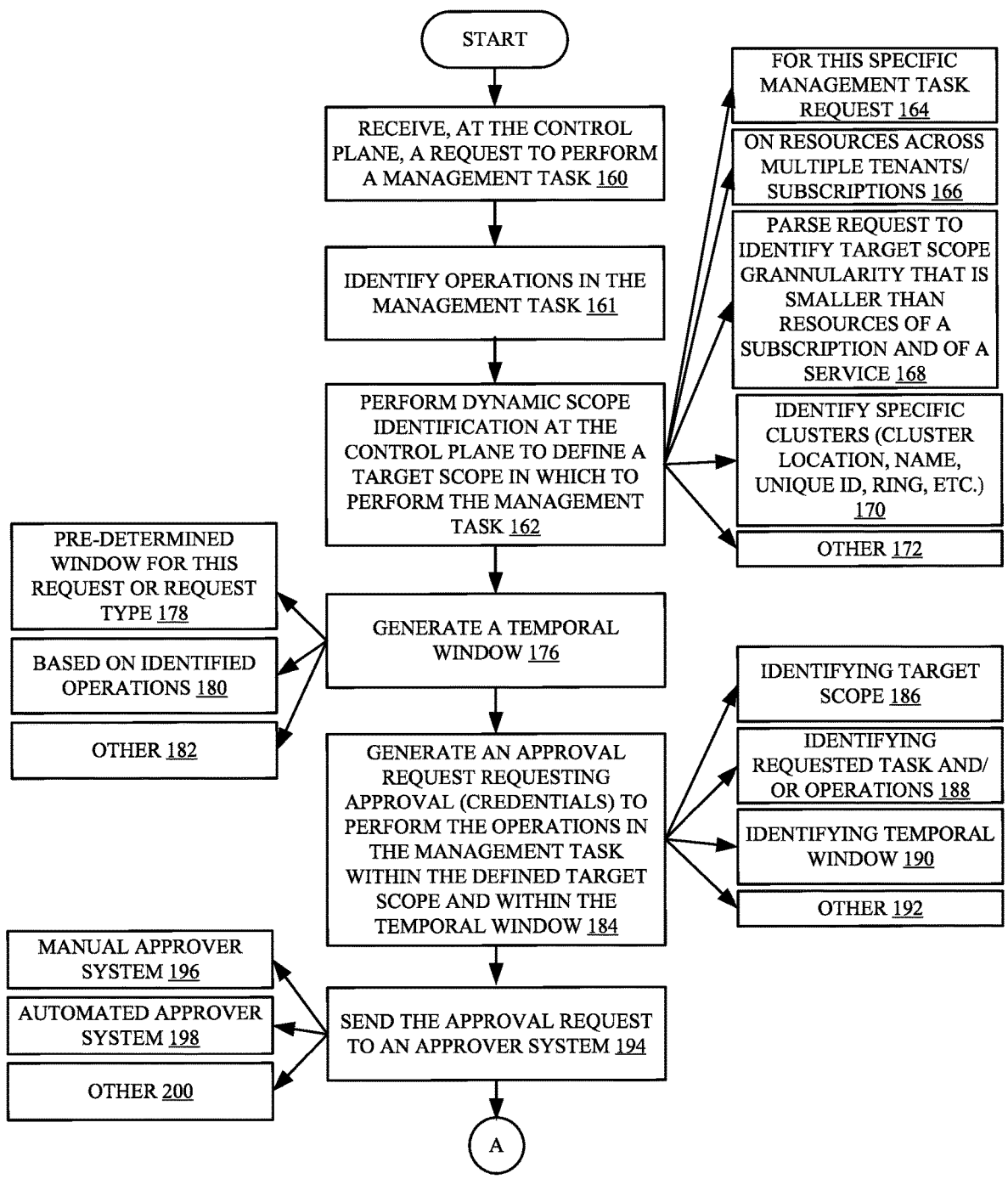
FIGS. 2A and 2B (collectively referred to herein as FIG. 2) show a flow diagram illustrating how a control plane in a computing system dynamically identifies a target scope for a management operation and obtains permissions to execute the management operation.
Figure 2B:
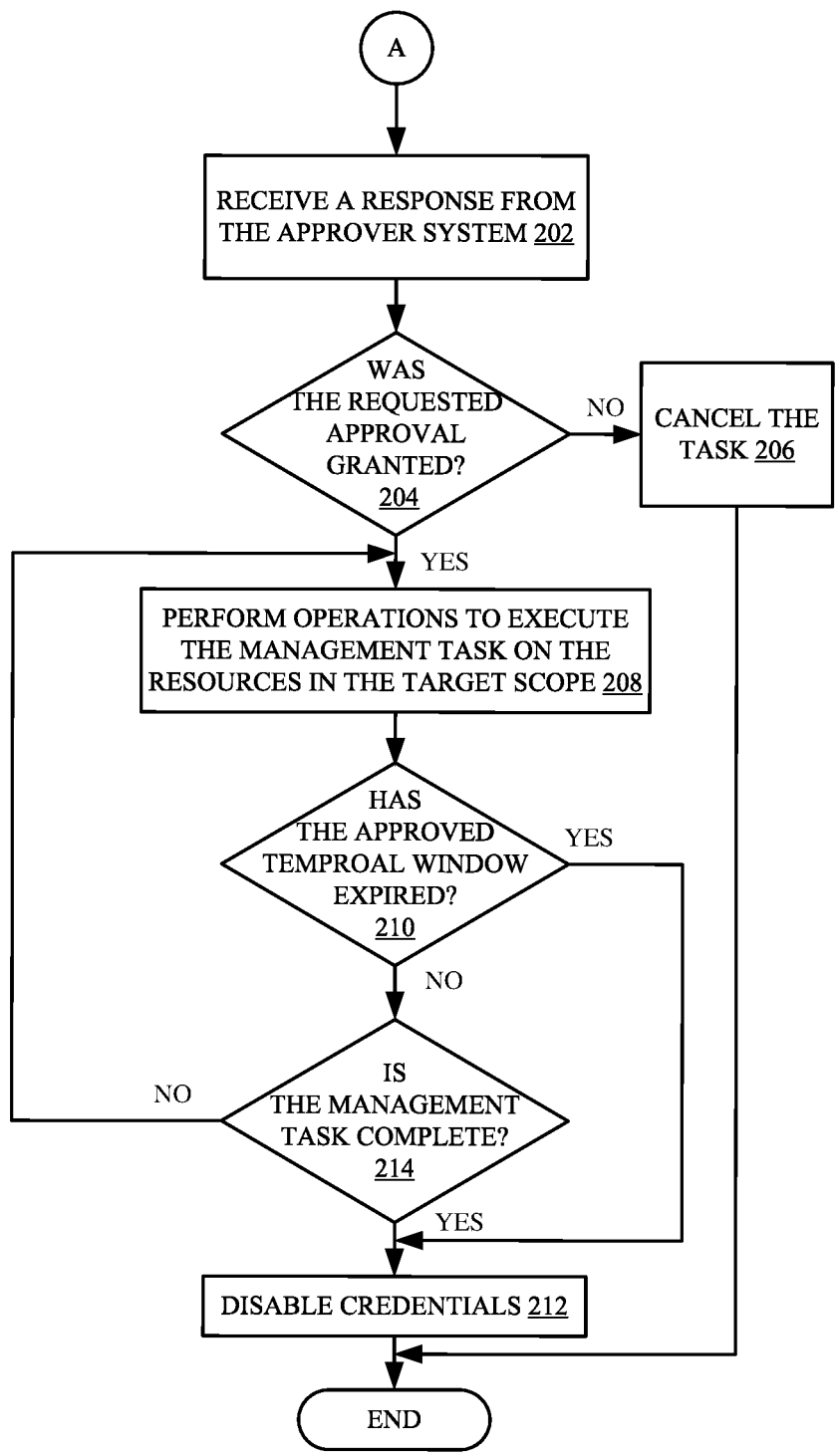

FIGS. 2A and 2B (collectively referred to herein as FIG. 2), show a flow diagram illustrating one example of the operation of computing system architecture 100 in dynamically identifying a target scope, and carrying out a requested management task. It is first assumed that the control plane (or control plane computing system 104) receives a request 152 to perform a management task. Receiving the request is indicated by block 160 in the flow diagram of FIG. 2.

Operation identifying system 124 can identify operations that are needed to be performed in order to execute the requested management task. Identifying the operations is indicated by block 161 in the flow diagram of FIG. 2. The specific operations that are to be performed may be used by dynamic scope identifying system 122 to identify the target scope. The specific operations identified by system 124 may also be provided to approval request generator 114 and identified in the approval request so that the approver system 105 can view the individual operations needed to perform the requested management task. These are simply different ways that the identity of the individual operations can be used in identifying target scope and obtaining approval.

The request 152 can be received by task request analysis system 112, and dynamic scope identifying system 122 dynamically identifies the target scope in computing system 106, within which the management task identified in request 152 is to be performed. Performing dynamic scope identification to define a target scope is indicated by block 162 in the flow diagram of FIG. 2. In one example, by "dynamic" it is meant that the target scope is identified for this specific management task request 152, as indicated by block 164 in the flow diagram of FIG. 2, on a request-by-request basis. So that, for each request to perform a management task that is received by system 122, system 122 identifies the target scope for that request and the target scope can change from request-to-request. The target scope can be identified by identifying hosted resource clusters 140-142 across multiple tenants and/or across multiple subscriptions, as indicated by block 166. Dynamic scope identifying system 122 can identify the target scope by parsing the request 152 to identify a granularity that is smaller than the compute capacity of one or more data access plane computing systems 106 or that is smaller than a subscription and/or a service. For instance, in some prior systems the control plane had standing or static permissions to an entire subscription, an entire set of client data, an entire hosted service and/or an entire compute capacity of a data center. In contrast, the present dynamic scope identifying system 122 identifies the target scope for carrying out the management task on a granularity that can be much smaller, such as a small set of resources across multiple subscriptions, a subset of resources within a compute capacity, a subset of resources hosted by a service, etc. Parsing the request to identify the target scope with desired granularity is indicated by block 168 in the flow diagram of FIG. 2. Dynamic scope identifying system 122 can also identify the target scope by considering the individual operations identified by operation identifying system 124.

Dynamic scope identifying system 122 can specifically identify the specific hosted resource clusters 140-142 that are within the target scope in a number of different ways. The resource clusters can be identified by cluster location, cluster name, a unique identifier that uniquely identifies one or more resource clusters, and/or the particular ring in which the resource clusters reside, among other things. Identifying the specific resource clusters that are within the target scope is indicated by block 170 in the flow diagram of FIG. 2. Dynamic scope identifying system 122 can perform dynamic scope identification in other ways as well, as indicated by block 172.

Time identifying system 126 then generates a temporal window (or time span) for which approval is sought. Generating the temporal window is indicated by block 176 in the flow diagram of FIG. 2. The temporal window may be a pre-determined window or time span that is requested for this particular type of management task, as indicated by block 178. In that case, the time identifying system 126 may use a correlation that correlates management task type to time window to identify the pre-determined temporal window corresponding to the requested management task. In another example, the temporal window may be identified based upon the individual operations in the management task that are identified by operation identifying system 124. Defining the temporal window based on the operations in the requested management task is indicated by block 180. The individual operations may have different latencies or may require a different amount of time, and therefore they may be used by time identifying system 126 to determine a suitable temporal window for which approval can be requested, and in which the management task can be performed. The temporal window can be generated in other ways as well, as indicated by block 182.

Approval request generator 114 then generates an approval request requesting approval (or credentials) from approver system 105. The approval request will illustratively request approval (or credentials) to perform the operations in the management task within the defined target scope, within the temporal window. Generating an approval request is indicated by block 184 in the flow diagram of FIG. 2. The approval request illustratively identifies the target scope, as indicated by block 186. The target scope can be identified using the identity of the specific hosted resource clusters 140-142, or in other ways. The approval request may also identify the requested management task and/or the individual operations that are to be performed in executing the management task, as indicated by block 188. The approval request can also identify the temporal window for which approval is sought, as indicated by block 190. The approval request can include other items 192 as well.

Once the approval request is generated by approval request generator 114, the approval request is provided to approval interaction system 116 which identifies the approver system 105 to which the approval request will be sent. Approval interaction system 116 then sends the approval request to the identified approver system 105, as indicated by block 194 in the flow diagram of FIG. 2. Based upon the type of management task requested, and based upon the target scope, the approver system 105 may be a manual approver system 196, an automated approval system 198, or another type of approver system 200.

Approval interaction system 116 handles any interactions with approver system 105 and eventually receives a response from the approver system 105. Receiving the response is indicated by block 202 in the flow diagram of FIG. 2. If the response from approver system 105 indicates that the approval request was not granted, as indicated by block 204, then the requested management task is cancelled, as indicated by block 206. However, if, at block 204, approval interaction system 116 determines that the approver system 105 has approved the request, then the approval includes credentials that can be used to access the target scope and perform the management task. System 116 generates a signal indicating this and provides that signal to operation performance functionality 118. Functionality 118 then uses the credentials to access the target scope in data plane 106 and begins performing operations in order to execute the management task on the computing system resources 136 within the target scope. Performing operations within the target scope is indicated by block 208 in the flow diagram of FIG. 2.

Operation performance functionality 118 continues to perform the operations in order to execute the requested management task, so long as the temporal window has not expired. If the temporal window expires, as indicated by block 210 in the flow diagram of FIG. 2, then the credentials provided by approver system 105 are disabled or expire as well, so that operation performance functionality 118 no longer has appropriate credentials to access the target scope and perform the operations within the target scope of computing system resources 136. Disabling the credentials (or detecting that they are no longer valid) is indicated by block 212 in the flow diagram of FIG. 2. If, however, at block 210 it is determined that the temporal window has not expired and the credentials are still valid, then operation performance functionality 118 continues to perform the operations until the management task is complete, as indicated by block 214 in the flow diagram of FIG. 2. Once the management task has been completed, then the credentials provided by approver system 105 are disabled as well.

It can thus be seen that the present description describes a system which dynamically identifies the target scope for a management task, prior to seeking approval from the approver system. The target scope is dynamic in that it is determined for each request to perform a management task, and it can be based upon the particular management task being executed. Once the target scope is dynamically identified, an approval request is generated which seeks the permissions or credentials that are needed to perform the management task within the target scope. Once approved, the management task is performed using the acquired permissions or credentials, within the target scope. After a pre-defined temporal window expires, then the credentials expire as well. In this way, even if approval is obtained for a surreptitious request, the scope of the resources that are compromised is limited, and the compromise is of a limited duration. This enhances system security and reduces the likelihood that a surreptitious operation can compromise customer data or other computing system resources.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays may have been discussed. The user interface can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 3:
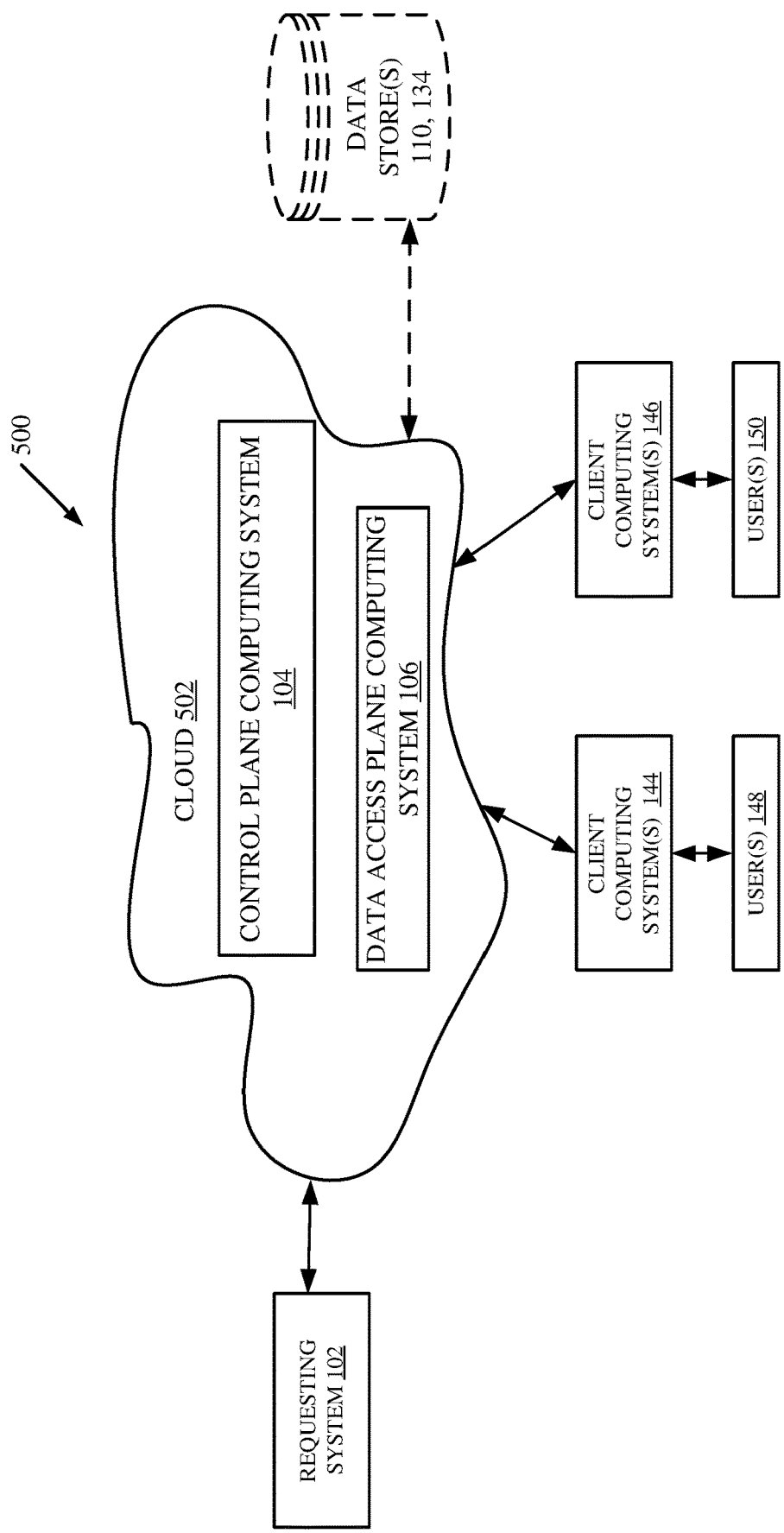
FIG. 3 is a block diagram showing one example of the computing system architecture illustrated in FIG. 1, deployed in a remote server architecture.

FIG. 3 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 3, some items are similar to those shown in FIG. 1 and they are similarly numbered. FIG. 3 specifically shows that control plane computing system 104 and data access plane computing system 106 can be located in cloud 502 (which can be public, private, or a combination where portions are public while others are private). Therefore, users 148-150 uses a client computing systems 144-146 to access those systems through cloud 502.

FIG. 3 also depicts another example of a cloud architecture. FIG. 3 shows that it is also contemplated that some elements of computing system architecture 100 can be disposed in cloud 502 while others are not. By way of example, data stores 110, 134 can be disposed outside of cloud 502, and accessed through cloud 502. In another example, requesting system 102 can be in cloud 502 or outside cloud 502. Regardless of where they are located, they can be accessed directly by system 144-146, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 4:
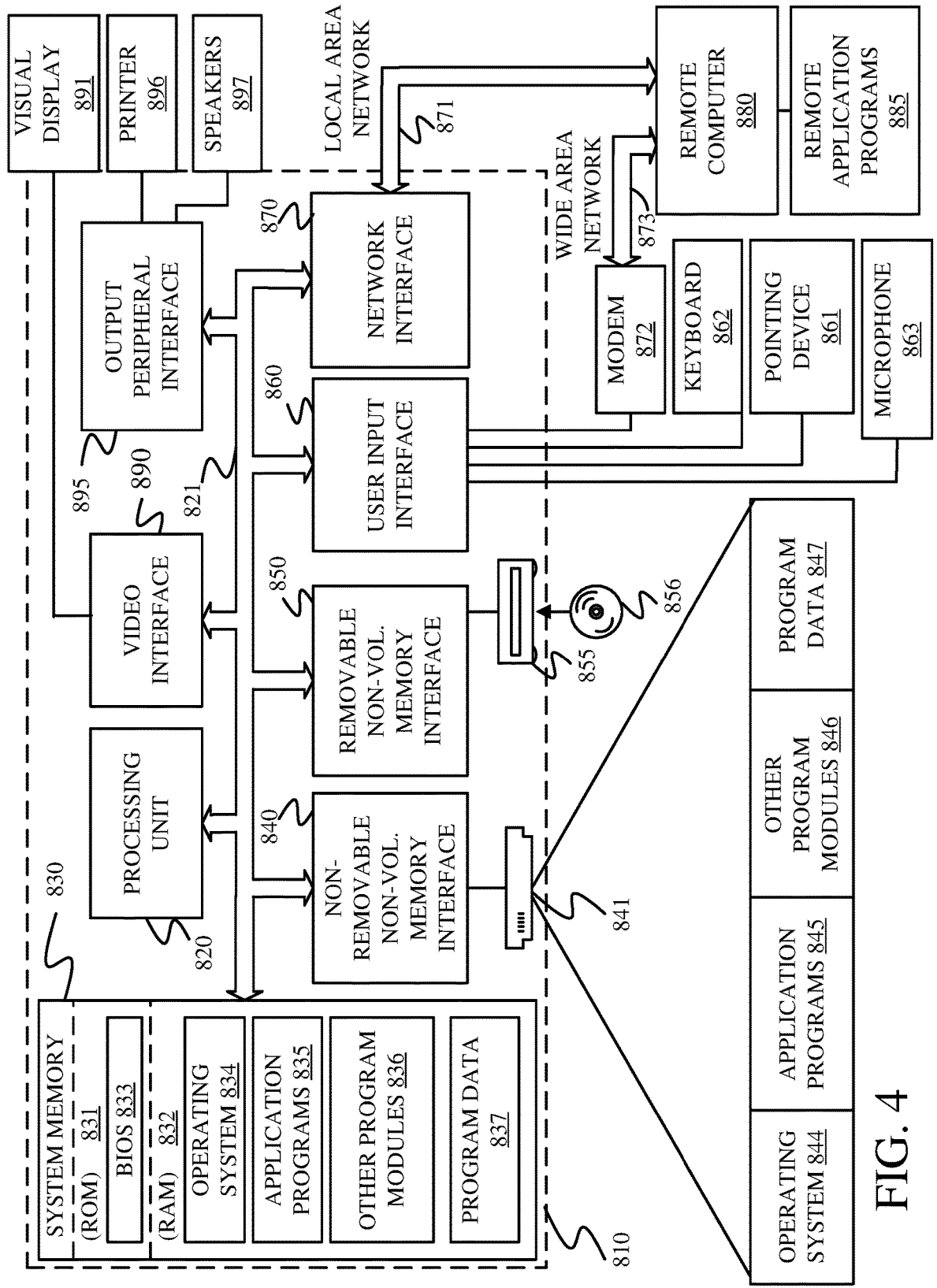
FIG. 4 is a block diagram of one example of a computing environment that can be used in the architectures illustrated in the previous figures.

FIG. 4 is one example of a computing environment in which architecture 100, or parts of it, (for example) can be deployed. With reference to FIG. 4, an example system for implementing some embodiments includes a general-purpose computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 4.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 4 illustrates operating system 834, application programs 835, other program modules 836, and program data 837.

The computer 810 may also include other removable/non-removable volatile/nonvolatile computer storage media. By way of example only, FIG. 4 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 4, provide storage of computer readable instructions, data structures, program modules and other data for the computer 810. In FIG. 4, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 4 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 4 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer system, comprising:
one or more processors; and
memory that stores computer executable instructions which, when executed by the one or more processors cause the one or more processors to implement:
a control plane computing system that receives a request to perform a management task on computing system resources in a data access computing system, the control plane computing system including a dynamic scope identifying system that identifies a target scope for the request, the target scope defining a scope of resources in the data access computing system within which the management task is performed;
an approval request generator generating an approval request requesting approval to perform the management task in the identified target scope;
an approval interaction system that sends the approval request to an approver system and receives a response from the approver system; and
operation performance functionality that generates an action signal based on the response from the approver system.

Example 2 is the computer system of any or all previous examples wherein the approval interaction system is configured to detect the response from the approver system as approving the approval request and, in response, the operation performance functionality is configured to perform the management task in the target scope.

Example 3 is the computer system of any or all previous examples wherein the approval interaction system is configured to detect the response from the approver system as not approving the approval request and, in response, the operation performance functionality is configured to canceling the management task.

Example 4 is the computer system of any or all previous examples wherein the approval interaction system is configured to receive credentials from the approver system that are valid for a time span and send the credentials to the operation performance functionality.

Example 5 is the computer system of any or all previous examples wherein operation performance functionality is configured to use the credentials to access the target scope and perform the management task during the time span and upon expiration of the time span determine that the credentials are disabled.

Example 6 is the computer system of any or all previous examples wherein the control plane computing system comprises:
an operation identifying system configured to identify operations to be performed in executing the management task.

Example 7 is the computer system of any or all previous examples wherein the operation performance functionality is configured to perform the operations until the operations are complete or until the time span expires.

Example 8 is the computer system of any or all previous examples wherein the dynamic scope identifying system is configured to identify, as the target scope, a target scope specific to the request based on the operations to be performed in executing the management task.

Example 9 is a computer implemented method, comprising:
receiving, at a control plane computing system, a request to perform a management task on computing system resources in a data access computing system;
identifying a target scope for the request at the control plane computing system, the target scope defining a scope of resources in the data access computing system within which the management task is performed;
generating an approval request requesting approval to perform the management task in the identified target scope;
sending the approval request to an approver system;
receiving a response from the approver system; and
generating an action signal based on the response from the approver system.

Example 10 is the computer implemented method of any or all previous examples wherein generating an action signal comprises:
detecting the response from the approver system as approving the approval request; and
performing the management task in the target scope.

Example 11 is the computer implemented method of any or all previous examples wherein generating an action signal comprises:
detecting the response from the approver system as not approving the approval request; and
canceling the management task.

Example 12 is the computer implemented method of any or all previous examples wherein detecting the response from the approver system as approving the approval request comprises:
receiving credentials that are valid for a time span.

Example 13 is the computer implemented method of any or all previous examples wherein performing the management task comprises:
using the credentials to access the target scope and perform the management task during the time span; and
upon expiration of the time span, disabling the credentials.

Example 14 is the computer implemented method of any or all previous examples and further comprising:
identifying, at the control plane computing system, operations to be performed in executing the management task.

Example 15 is the computer implemented method of any or all previous examples wherein performing the management task in the target scope comprises:
performing the operations until the operations are complete or until the time span expires and then disabling the credentials.

Example 16 is the computer implemented method of any or all previous examples wherein identifying a target scope comprises:
identifying, as the target scope, a target scope specific to the request based on the operations to be performed in executing the management task.

Example 17 is a computer implemented method, comprising:
receiving, at a control plane computing system, a request to perform a management task on computing system resources in a data access computing system;
in response to receiving the request, identifying a target scope specific to the request at the control plane computing system, the target scope defining a scope of resources in the data access computing system within which the management task is performed;
generating an approval request requesting approval to perform the management task in the identified target scope;
sending the approval request to an approver system;
receiving a response from the approver system; and
generating an action signal based on the response from the approver system.

Example 18 is the computer implemented method of any or all previous examples wherein generating an action signal comprises at least one of:
detecting the response from the approver system as approving the approval request and performing the management task in the target scope; or
detecting the response from the approver system as not approving the approval request and canceling the management task.

Example 19 is the computer implemented method of any or all previous examples wherein detecting the response from the approver system as approving the approval request comprises receiving credentials that are valid for a time span and wherein performing the management task comprises:
using the credentials to access the target scope and perform the management task during the time span.

Example 20 is the computer implemented method of any or all previous examples wherein identifying a target scope comprises identifying, at the control plane computing system, operations to be performed in executing the management task and wherein performing the management task in the target scope comprises:
performing the operations until the operations are complete or until the time span expires and then disabling the credentials.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system, comprising:
one or more processors; and
memory that stores computer executable instructions which, when executed by the one or more processors cause the one or more processors to implement:
a control plane computing system that receives a request to perform a management task on computing system resources in a data access computing system, the control plane computing system including a dynamic scope identifying system that identifies a target scope for the request, the target scope defining a scope of resources in the data access computing system within which the management task is performed;
an approval request generator that generates an approval request that identifies the target scope and requests approval to perform the management task in the target scope;
an approval interaction system that
sends, to an approver system, the approval request that identifies the target scope, and
receives, from the approver system, a response that identifies whether the management task is approved; and
operation performance functionality that generates an action signal corresponding to the management task based on the response from the approver system.

2. The computer system of claim 1 wherein the approval interaction system is configured to detect the response from the approver system as approving the approval request and, in response, the operation performance functionality is configured to perform the management task in the target scope.

3. The computer system of claim 2 wherein the approval interaction system is configured to detect the response from the approver system as not approving the approval request and, in response, the operation performance functionality is configured to canceling the management task.

4. The computer system of claim 2 wherein the approval interaction system is configured to receive credentials from the approver system that are valid for a time span and send the credentials to the operation performance functionality.

5. The computer system of claim 4 wherein operation performance functionality is configured to use the credentials to access the target scope and perform the management task during the time span and upon expiration of the time span determine that the credentials are disabled.

6. The computer system of claim 5 wherein the control plane computing system comprises:
an operation identifying system configured to identify operations to be performed in executing the management task.

7. The computer system of claim 6 wherein the operation performance functionality is configured to perform the operations until the operations are complete or until the time span expires.

8. The computer system of claim 6 wherein the dynamic scope identifying system is configured to identify, as the target scope, a target scope specific to the request based on the operations to be performed in executing the management task.

9. A computer implemented method, comprising:
receiving, at a control plane computing system, a request to perform a management task on computing system resources in a data access computing system;
identifying a target scope for the request at the control plane computing system, the target scope defining a scope of resources in the data access computing system within which the management task is performed;
generating an approval request that identifies the target scope and requests approval to perform the management task in the target scope;
sending, to an approver system, the approval request that identifies the target scope;
receiving, from the approver system, a response that identifies whether the management task is approved; and
generating an action signal corresponding to the management task based on the response from the approver system.

10. The computer implemented method of claim 9 wherein generating an action signal comprises:
detecting the response from the approver system as approving the approval request; and
performing the management task in the target scope.

11. The computer implemented method of claim 10 wherein generating an action signal comprises:
detecting the response from the approver system as not approving the approval request; and
canceling the management task.

12. The computer implemented method of claim 10 wherein detecting the response from the approver system as approving the approval request comprises:
  receiving credentials that are valid for a time span.

13. The computer implemented method of claim 12 wherein performing the management task comprises:
  using the credentials to access the target scope and perform the management task during the time span; and
  upon expiration of the time span, disabling the credentials.

14. The computer implemented method of claim 13 and further comprising:
  identifying, at the control plane computing system, operations to be performed in executing the management task.

15. The computer implemented method of claim 14 wherein performing the management task in the target scope comprises:
  performing the operations until the operations are complete or until the time span expires and then disabling the credentials.

16. The computer implemented method of claim 14 wherein identifying a target scope comprises:
  identifying, as the target scope, a target scope specific to the request based on the operations to be performed in executing the management task.

17. A computer implemented method, comprising:
  receiving, at a control plane computing system, a request to perform a management task on computing system resources in a data access computing system;
  in response to receiving the request, identifying a target scope specific to the request at the control plane computing system, the target scope defining a scope of resources in the data access computing system within which the management task is performed;
  generating an approval request that identifies the target scope and requests approval to perform the management task in the target scope;
  sending, to an approver system, the approval request that identifies the target scope;
  receiving, from the approver system, a response that identities whether the management task is approved; and
  generating an action signal corresponding to the management task based on the response from the approver system.

18. The computer implemented method of claim 17 wherein generating an action signal comprises at least one of:
  detecting the response from the approver system as approving the approval request and performing the management task in the target scope; or
  detecting the response from the approver system as not approving the approval request and canceling the management task.

19. The computer implemented method of claim 18 wherein detecting the response from the approver system as approving the approval request comprises receiving credentials that are valid for a time span and wherein performing the management task comprises:
  using the credentials to access the target scope and perform the management task during the time span.

20. The computer implemented method of claim 19 wherein identifying a target scope comprises identifying, at the control plane computing system, operations to be performed in executing the management task and wherein performing the management task in the target scope comprises:
  performing the operations until the operations are complete or until the time span expires and then disabling the credentials.

* * * * *